United States Patent
Yang et al.

(10) Patent No.: US 6,552,746 B1
(45) Date of Patent: Apr. 22, 2003

(54) APPARATUS HAVING AN IMAGE SENSOR THAT IS VARIABLE IN SPATIAL RESOLUTION AND BIT RESOLUTION AND ASSOCIATED METHOD

(75) Inventors: Xiao D. Yang, Palo Alto, CA (US); Zhonghan Deng, Albany, CA (US)

(73) Assignee: Pixim, Inc., Mountain View, CA (US)

( * ) Notice: Subject to any disclaimer, the term of this patent is extended or adjusted under 35 U.S.C. 154(b) by 0 days.

(21) Appl. No.: 09/337,473

(22) Filed: Jun. 21, 1999

Related U.S. Application Data

(63) Continuation of application No. 09/158,664, filed on Sep. 22, 1998.

(51) Int. Cl.[7] ............................................. H04N 5/335
(52) U.S. Cl. ..................................... 348/308; 250/208.1
(58) Field of Search ................................ 348/294, 295, 348/300, 301, 302, 303, 308; 257/222; 250/208.1

(56) References Cited

U.S. PATENT DOCUMENTS 6,020,581 A * 2/2000 Dennard et al. ......... 250/208.1
6,115,065 A * 9/2000 Yadid-Pecht et al. ........ 348/308
6,421,085 B1 * 7/2002 Xu .............................. 348/308
6,433,822 B1 * 8/2002 Clark et al. .................. 348/241

* cited by examiner

Primary Examiner—Tuan Ho
(74) Attorney, Agent, or Firm—Joe Zheng

(57) ABSTRACT

The invention relates to a CMOS image sensor that can be embedded in portable imaging systems. This high spatial resolution and low bit resolution CMOS area image sensor not only enables portable imaging systems such as cellular fax phone, portable copy machines, barcode reader, but also it can be fabricated in standard digital CMOS processes, particularly at 0.35 micron and below. This invention also discloses several portable imaging systems using such a CMOS image sensor. This invention further discloses a CMOS image sensor that has variable spatial resolution and bit resolution. Starting as a high spatial resolution low-bit resolution image sensor, the high bit-resolution is achieved by combining information from a group of nearest-neighbor pixels into a single super-pixel via spatial oversampling. This variable CMOS image sensor can be used in a multiple function imaging device for both document and video imaging, or photography.

19 Claims, 15 Drawing Sheets

(a) Front view  (b) side view (c) Bottum view  (b) Top view

APPARATUS HAVING AN IMAGE SENSOR THAT IS VARIABLE IN SPATIAL RESOLUTION AND BIT RESOLUTION AND ASSOCIATED METHOD

This application is a continuation of Ser. No. 09/158,664 filed Sep. 22, 1998.

FIELD OF THE INVENTION

The present invention relates to the field of image sensors and more particularly, CMOS-type area image sensors., and imaging reading, transmission and/or reproducing apparatus such as facsimile devices, document copiers, and optical barcode readers.

BACKGROUND OF THE INVENTION

Presently many imaging systems use solid-state charge coupled devices (CCD) as image sensors which sense input light, convert light intensity into electronic signal for readout. Because CCDs are made by highly specialized fabrication processes designed for imaging purposes, CCD fabrication processes are generally not compatible with a complementary-metal-oxide-silicon ("CMOS") device fabrication process. Today almost all microprocessors, application-specific integrated circuits (ASICs), and memory products are CMOS-type devices. As a result, a CCD image sensor requires separate support electronics, usually CMOS devices, to provide timing, clocking and signal processing functions. Another drawback of CCDs is that they consume a large amount of power (e.g., watts). In addition, high spatial resolution area CCD sensors are expensive.

CMOS as a silicon technology has also been used to perform image sensing. The purported advantage of CMOS image sensors is the potential of integrating image sensing, readout, analog to digital conversion (ADC), signal processing, control and memory, all on a single chip. This results in a much smaller and lower cost imaging system, and it consumes a lot less power than a CCD imaging system.

However, earlier generations of CMOS have large minimum transistor gate-length (e.g., greater than 2 microns). Such large transistor size would make a CMOS image sensor pixel too big for required spatial resolution in typical image sensing applications. The spatial resolution of an image sensor refers to the planar size of an image sensor array (e.g., a 640×480 is of VGA spatial resolution).

With the recent improvement of the CMOS technology, the transistor size of each generation CMOS device rapidly shrinks, following an exponential trend commonly called as the Moore's law. At around 1.2 micron feature size, CMOS technology has become competitive in making image sensors, at least for low spatial resolution consumer grade applications.

The continued advancement of the CMOS technology, however, presents a new challenge for CMOS image sensors. As the minimum feature size of a CMOS shrinks (e.g., from 0.5 micron to 0.35, 0.25, 0.18, 0.13 micron), voltage supply used for CMOS devices reduces, junction depth decreases, and doping level increases. This generally leads to a smaller signal swing, reduced photo detector sensitivity and increased leakage current. As a result, the signal-to-noise ratio (SNR) and the dynamic range of a CMOS image sensor is likely to get worse, resulting in degraded image quality. Consequently, as the minimum feature size of a CMOS process continues to shrink, it would be very difficult to provide a high bit resolution CMOS area image sensor. High bit resolution refers herein to the brightness resolution and is fundamentally limited by the signal-to-noise ratio.

It has been proposed that some kind of modification of a standard CMOS process (i.e., making changes to the CMOS fabrication process designed for making digital and/or analog circuits for the specific purpose of making an image sensor) be made in order to achieve adequate imaging performance in CMOS image sensors. Such modification may include, for example, an additional step of ion implantation, that is intended for improving the image sensing of photo detectors in the CMOS sensors.

The drawback of modifying a standard CMOS process is that it detracts from the fundamental advantage of making image sensors by using the same CMOS process for making analog or digital circuit to make CMOS image sensors, i.e., the economy of fabricating them on standard CMOS fabrication lines.

Fossum, E., in "CMOS Image Sensors: Electronic Camera On A Chip", IEDM 95, 17–25, 1995, described a 256×256 CMOS image sensor made using 0.9 micron CMOS technologies, and 1024×1024 image sensors made using 0.5 micron CMOS technologies, both without monolithically integrated timing and control circuit. This type of CMOS image sensors without integrated timing and control circuit are not desirable because of the lack of integration. The article also discloses a 256×256 CMOS image sensor with integrated timing and control logic made with 1.2 micron process. The spatial resolution of this chip, however, is too low for high spatial resolution applications, such as facsimile. Further, if scaled to the deep sub-micron range, the image quality obtained from this image sensor would be degraded due to reduced signal level.

U.S. Pat. No. 5,666,159 describes a CCD video camera integrated in a cellular telephone handset. However, due to the drawbacks associated with CCD, this integrated CCD camera/cellular phone would consume a large amount of power and not suitable for cellular application.

It is therefore an object of the present invention to provide a high spatial resolution CMOS image sensor having a minimum feature size which can be continuously scaled as CMOS technologies advances;

It is another object of the present invention to provide a CMOS area image sensor which can be used for both document imaging and video imaging;

It is another object of the present invention to provide a CMOS area image sensor for document imaging, such as facsimile imaging;

It is a further object of the present invention to apply the CMOS area image sensors of the present invention in image sensing applications; and It is a still further object of the present invention to provide a CMOS area image sensor for portable document-related image applications.

SUMMARY OF THE INVENTION

These and other objects are achieved in the present invention, which provides a CMOS area image sensor having a bit resolution of less than 6-bits and a high spatial resolution. The CMOS sensor is fabricated in accordance with a CMOS process characterized by having a minimum gate length of 0.35 micron or less. The CMOS image sensor includes a pixel sensor array having at least 1000×900 pixels and a timing and control generation circuit for generating timing and control signals for said image sensor. A row selecting circuit is provided for selecting one or more rows of pixels for readout. A column processor is provided for selecting one of more columns of pixels for readout. An input/output circuit is provided as a data interface for the CMOS area image sensor. The timing and control generation circuit, the row selecting circuit, the column processor, and input/output circuit are monolithically integrated with the pixel sensor array.

Preferably, the CMOS area image sensor further includes a monolithically integrated digital signal processor for performing digital signal processing. More preferably, for facsimile applications, the digital signal processor includes signal processing means for facsimile application; for document reproduction or copying, the digital signal processor includes signal processing means for document reproduction or copying; for barcode reading and decoding, the digital signal processor includes signal processing means for barcode sensing and decoding. A monolithically integrated memory device may also be included in the CMOS area image sensor.

In accordance with another aspect of the present invention, a CMOS area image sensor with analog dithering is provided. The CMOS area image sensor includes analog dithering means for performing dithering on analog image signal before or during such analog signal being converted to digital image signal, but not after such signal is digitized.

In accordance with another aspect of the present invention, a variable bit and spatial resolution CMOS area image sensor is provided. This CMOS sensor includes means for performing suitable spatial oversampling to achieve desired bit resolution. This CMOS sensor may be used for document imaging, such as facsimile imaging and copying where low bit resolution is sufficient, as well as video imaging or photography where high bit resolution is required.

In accordance with another aspect of the present invention, an imaging apparatus is provided. The apparatus includes an optical system for projecting an image onto a CMOS area image sensor of the present invention. The CMOS image sensor has a bit resolution of less than 6-bits and a high spatial resolution and is fabricated in accordance with a CMOS process characterized by having a minimum gate length of 0.35 micron or less. The CMOS image sensor includes a pixel sensor array having at least 1000×900 pixels, a timing and control generation circuit for generating timing and control signals for said image sensor, a row selecting circuit for selecting one or more rows of pixels for readout, a column processor for selecting one of more columns of pixels for readout, and an input/output circuit for providing a data interface.

In accordance with another aspect of the present invention, a communications device for cellular voice communications and image transmission is provided. The device includes cellular communications means for providing cellular communications, a CMOS area image sensor of the present invention for facsimile operation, and means for transmitting facsimile image data representing an image captured by the CMOS image sensor to a remote location.

BRIEF DESCRIPTION OF THE DRAWINGS

These and other features, objects, and advantages of the present invention will become more apparent from the following detailed description in conjunction with the appended drawings, in which.

DETAILED DESCRIPTION OF THE INVENTION

In accordance with the present invention, a CMOS area image sensor having a bit resolution of less than 6-bits and a spatial resolution of at least 1000×900 is provided. The CMOS image sensor is particularly adapted for low bits (i.e., less than 6-bits) resolution and high spatial resolution applications, such as facsimile imaging or document imaging. For example, for sending a U.S. letter-size document by facsimile, the required spatial resolution of an area image sensor needs to be at least 1728×1078 but bit resolution may be only 1-bit (i.e., black and white).

Figure 1:
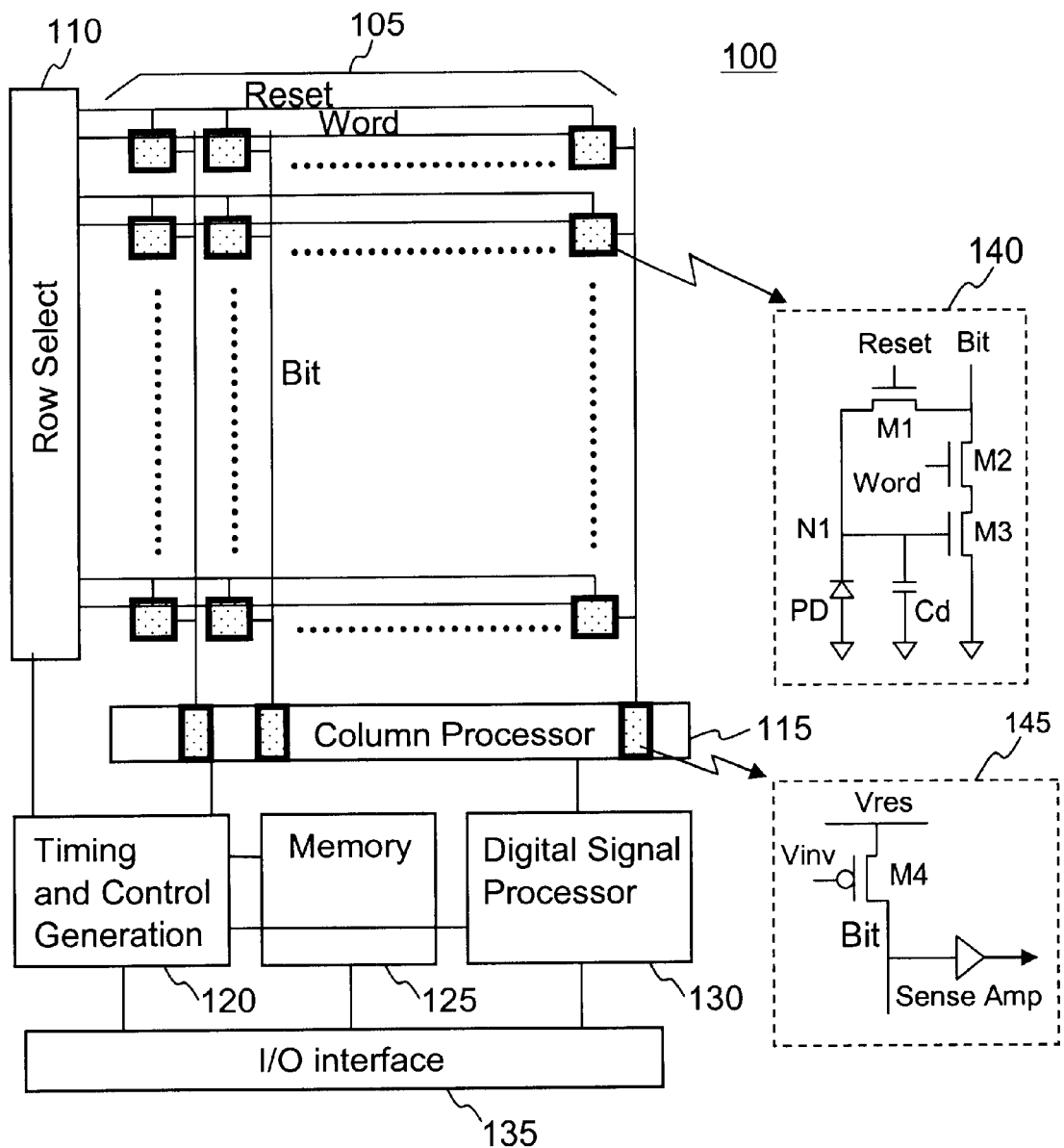
FIG. 1 is the block diagram of a 1-bit resolution and high spatial resolution CMOS area image sensor of the present invention.

FIG. 1 illustrates, in a preferred embodiment, the architecture of a CMOS area image sensor 100 of the present invention having a 1-bit resolution and a spatial resolution of 1728×1078 for facsimile applications. Image sensor 100 includes a two-dimensional sensor array 105 of sensor pixels having 1728×1078 pixels for sensing an image and generating corresponding electrical signals.

A row selecting circuit 110 (e.g., a row decoder) is connected to each of the rows of sensor pixels and it performs two main functions: (1) selecting, through wordline and transistor M2, one or more rows of sensor pixels for reading out the image signal stored at node N1 of photodetector PD; and (2) selecting, through Reset line and transistor M1, one or more rows of sensor pixels for resetting the signal level at N1 in each sensor (through the bitline).

Image signal from each column of sensor pixels is readout through a column processor 115 which includes a sense circuit 145 of the present invention. As will be described in detail, signal sense circuit 145 also converts analog image signal into digital signal and sends such digital signal to a digital signal processor 130, which performs desired digital signal processing on the digital signal before sending the processed digital signal to an I/O interface 125. An on-chip memory (125) is used to store data or software instructions.

In the preferred embodiment, the pixel array, row selecting circuit, column processor, digital signal-processor, and I/O interface are all monolithically integrated on a single chip. It should be apparent, however, the memory and digital-signal-processor may be circuits not monolithically formed on the same chip with the sensor array.

In FIG. 1, insert 140 is a schematic circuit diagram of a sensor pixel of the present invention which includes a photosensor PD, and three transistors M1, M2 and M3. The schematic circuit diagram for a sensing circuit in the column processor for sensing a column of pixels is shown in an insert 145 of FIG. 1. A more detailed illustration of the connection between the sensor pixels and the sensing circuit in the column processor is shown in FIG. 2.

Figure 2:
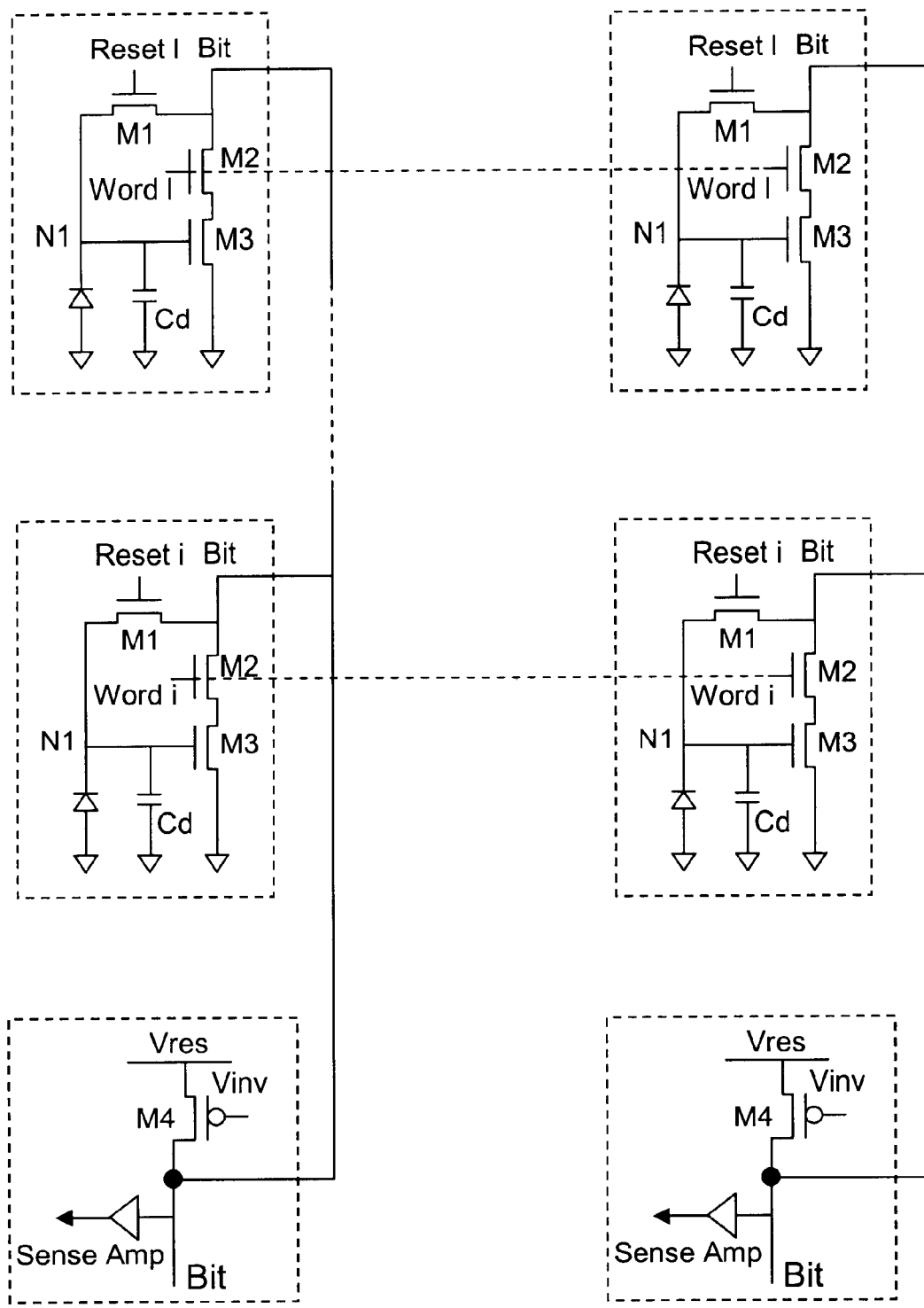
FIG. 2 shows the circuit schematic diagram of portion of the CMOS image sensor of FIG. 1.

Referring to FIGS. 1 and 2, in each pixel sensor 140, the gate of transistor M1 is connected to row selecting circuit 110 for reset. The gate of transistor M2 is connected to row decoder 115 through a wordline. A drain terminal of transistor M2 is connected to column processor 115 through a bitline. Readout circuit 145 includes a n-channel transistor M5 and a p-channel transistor M4, and a sense amplifier.

Figure 3:
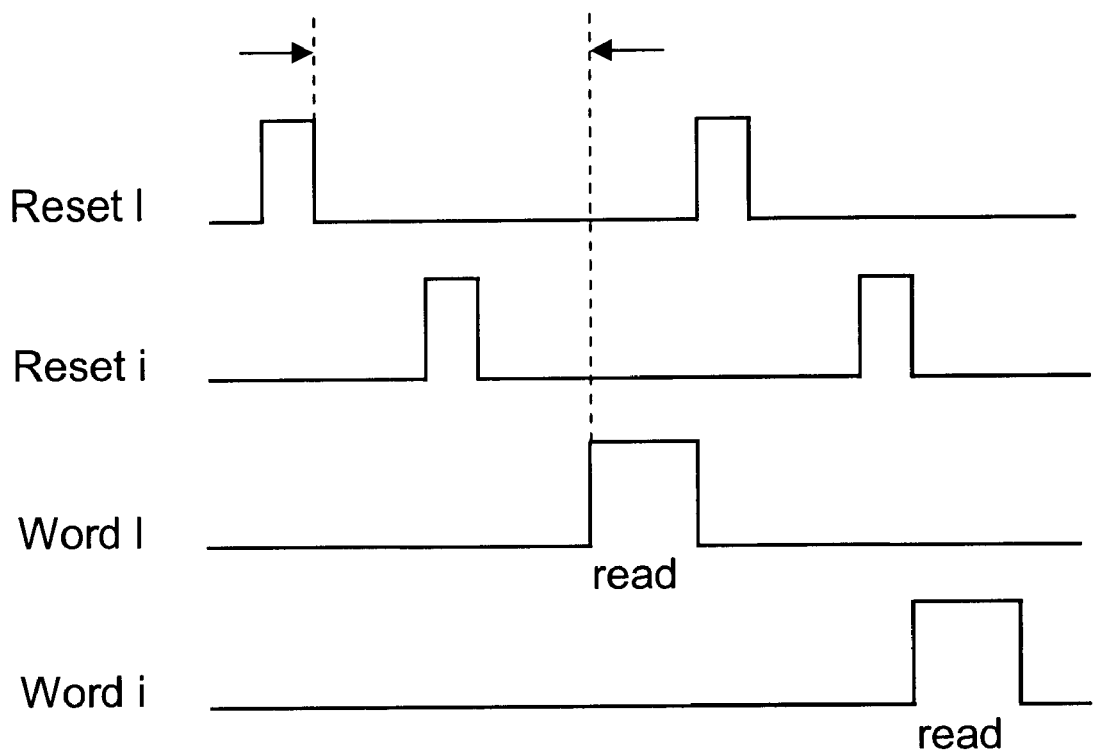
FIG. 3 illustrates signal waveforms for the CMOS area image sensor of FIG. 1.

The operation of this CMOS sensor for 1-bit facsimile operation is as follow. Referring also to FIG. 3, which illustrates the waveforms of all relevant signals, node N1 of photodiode PD is first reset to a voltage $V_{reset}$ on the bitline by pulsing Reset line to briefly turn on transistor M1. Then, photodiode PD begins to collect electrical charges generated by the optical signal, and voltage V1 at node N1 decreases as more and more charges are collected. After a certain amount of exposure time $T_{exp}$ (during which the charges are collected), the voltage $V1=V_{reset}-IT_{exp}/C_d$ is readout via an inverting voltage amplifier consisting of transistors M3 and M4, where I denotes photon induced current and $C_d$ denotes the parasitic capacitance on node N1.

The inverting voltage amplifier includes transistors M3 and M4 forming as a digital inverter. The image signal, after going through the inverting voltage amplifier, is sent to the sense amplifier, which converts it into a binary value and provides it to digital signal processor 130.

In accordance with the present invention, digital signal processor 130 includes a facsimile coding unit to compress and format signal received from the sense amplifier into a facsimile-ready data. In one embodiment, the format is the CCITT Fax Group III. The output facsimile-ready data is finally sent out to a system main memory (not shown) or main storage (not shown) and saved for proofreading, facsimile transmitting, printing or reviewing.

One major advantages of this 1-bit, 1728×1078 CMOS area image sensor of the present invention is its simplicity—no separate analog-to-digital converter (ADC) is needed or used to sense image signal. The inverting voltage amplifier (also a digital inverter) and the sense amplifier operate together to provide binary image data to digital signal processor.

In accordance with the present invention, analog halftoning (i.e., analog dithering) is performed by the CMOS image sensor illustrated in FIG. 1 either before digitization by changing the reset values for the photodiode or during digitization by changing the threshold values of the inverting amplifier. This will be described in detail below.

For low bit resolution applications, often it is desirable to perform dithering to make up for the poor quality of low bit images. For example, gray scale fax images are really 1-bit black-and-white pictures. To generate such an image, the conventional method has been to first obtain a much higher quality (e.g., 4–5 bit or more) image and then apply a dithering matrix to halftone the gray scale image into a 1-bit black-and-white picture.

Before describing analog dithering, digital dithering is briefly described. Assuming in a facsimile image, a particular pixel has an analog input x which will be converted to a 1-bit signal $x_b$ ("b" refers to the location or coordinates of the pixel). Assuming that x is normalized to (0,1). If dithering is not performed, then, after digitizing, $x_b$ is simply a "0" if x<1/2, and a "1" if 1/2<=x<1. In other words, x is compared with a threshold of 1/2. If dithering is performed, then x will compare with a threshold value (e.g., 7/16) that depends on the position of pixel.

The position of the pixel refers to the relative position of the pixel, which is associated with a particular threshold value, as compared with the other pixels. For example, a 4×4 dithering mask is applied on a image repeatedly (i.e., tiling up the 4×4 mask over the entire image), each pixel of the dithering mask referring to a threshold value, such as follows:

| 0/16  | 1/16  | 2/16  | 3/16  |
|-------|-------|-------|-------|
| 4/16  | 5/16  | 6/16  | 7/16  |
| 8/16  | 9/16  | 10/16 | 11/16 |
| 12/16 | 13/16 | 14/16 | 15/16 |

Then left upper corner pixel (1,1) has a threshold value of 0/16, pixel (1,2) has a threshold value of 1/16, pixel (2,4) (i.e., the fourth pixel on the second row) has a threshold value of 7/16. Also, pixel (1,5) has a value of 0/16, same as pixel (1,1); pixel (2,5) has a value of 4/16, same as pixel (2,1).

To conduct digital dithering, x is first digitized to a 4-bit digital number xd and then compared with 7/16 in the digital domain to obtain $X_a$. Note that comparing with a different threshold (i.e., 7/16) can be done either with a comparator with a threshold of 7/16 or by adding a value of 1/16 to xd and then compare with a fixed threshold of 1/2.

In accordance with the present invention, dithering is applied to the input signal in the analog domain and then obtain a 1-bit digital code with a simple inverter.

First, the threshold values of the inverting amplifier can be changed according to the following relationship:

$$\text{Inverter Threshold} = \sqrt{\frac{K_4}{K_3}} (V_{res} - V_{inv} - |V_{TP}|) + V_{TN}$$

where the reset voltage, $V_{res}$, is the voltage provided at the source of transistor M4. $V_{TP}$ is the threshold voltage of PMOS transistor M4; and $V_{TN}$ is the threshold voltage of NMOS transistor M3.

k3 is expressed as unit $k3=\mu_n C_{ox} W3/L3$, where $\mu_n$ is the electron mobility, $C_{ox}$ is the unit capacitance of the gate oxide, and W3 and L3 are the gate width and gate length, respectively, of transistor M3. k4 is expressed as $k4=\mu_p C_{ox} W4/L4$, where $\mu_p$ is the hole mobility, $C_{ox}$ is the capacitance of the gate oxide, and W4 and L4 are the gate width and gate length, respectively, of transistor M4.

From the above equation, it is seen that the inverter threshold can be changed by changing either $V_{res}$, $V_{inv}$ (i.e., voltage applied to the gate of transistor M4) and/or K4/K3. K4/K3 may be changed by changing the sizes of transistors M3 and/or M4.

Second, the photodetector reset value is set or changed in one of two ways: 1) During reset, row access transistor M2 is turned on (via the wordline) so that the reset value is set by the current source from transistor M4 which is controlled by $V_{inv}$ applied to the gate of transistor M4. In this case, $V_{reset}$ is equal to the inverter threshold. 2) During reset, row access transistor M2 is kept turned off (via the wordline); in the case, $V_{reset}$ is equal to $V_{res}$. Note that in both ways, during reset, transistor M5 is kept off by keeping $V_{amp}$ low.

The advantage of analog dithering is that it obviates digital dithering. Further, for 1-bit applications, it does not even need an analog-to-digital converter.

It should be noted that application of the analog dithering (i.e., halftoning) method of the present invention as described above is not limited to the specific CMOS area image sensor of the preferred embodiment. It can also be used in other types of CMOS sensors, including, but not limited to, CMOS image sensors having conventional passive pixel sensors (PPS), conventional active pixel sensors (APS) or pixel level ADC sensor arrays.

In accordance with the present invention, as described above, analog dithering is achieved by changing the reset value, which is accomplished by either adding a signal to the pixel prior to sensing or changing the comparator threshold value.

Analog addition can be done by changing the reset value of the photodetector in each pixel, and variable threshold comparator can be implemented in various ways well known to circuit designers. It should be apparent that, if desired, digital dithering may also be performed after analog dithering.

Figure 4:
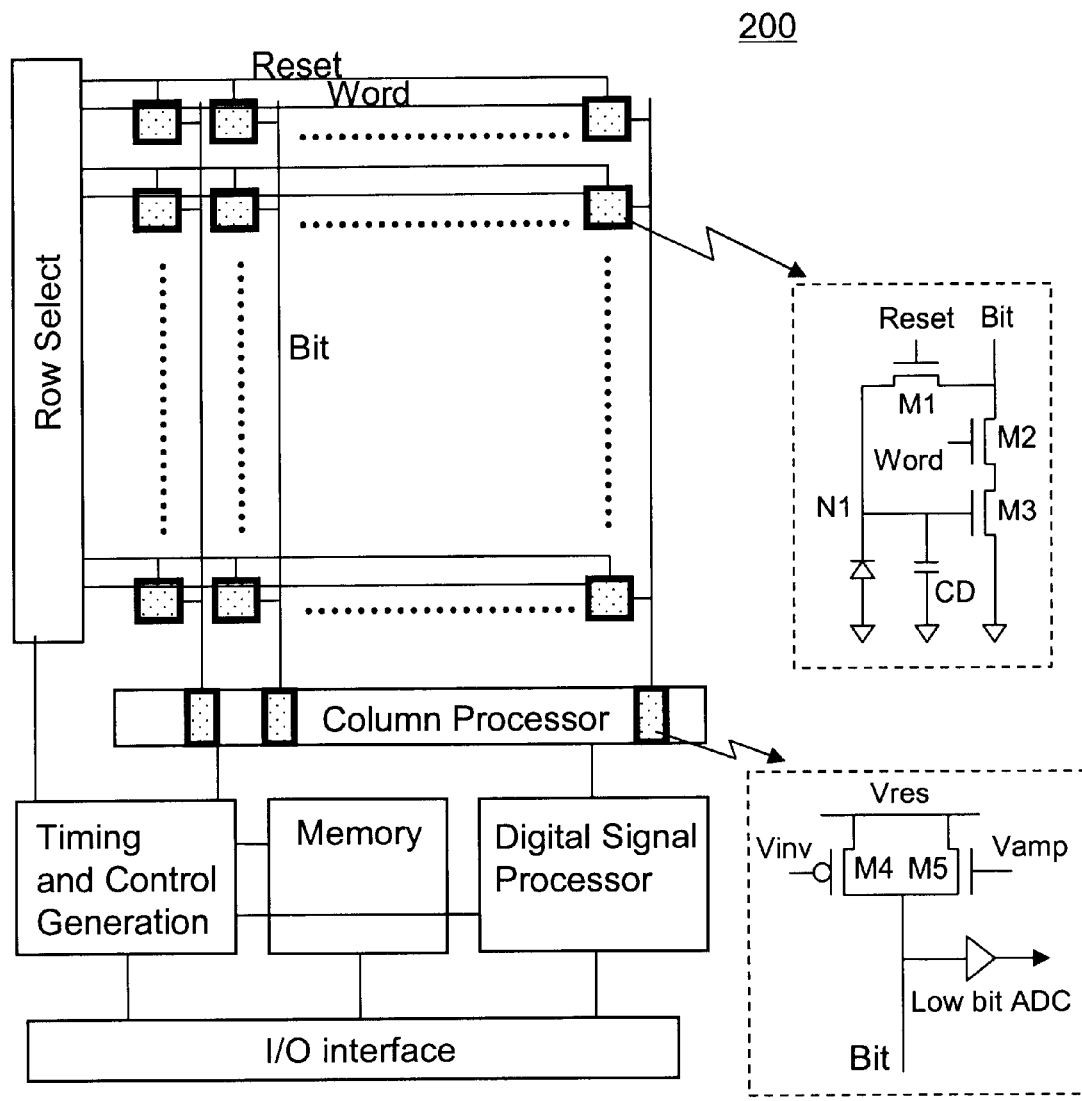
FIG. 4 is the block diagram of a low bit resolution but high spatial resolution CMOS area image sensor of the present invention.
Figure 5:
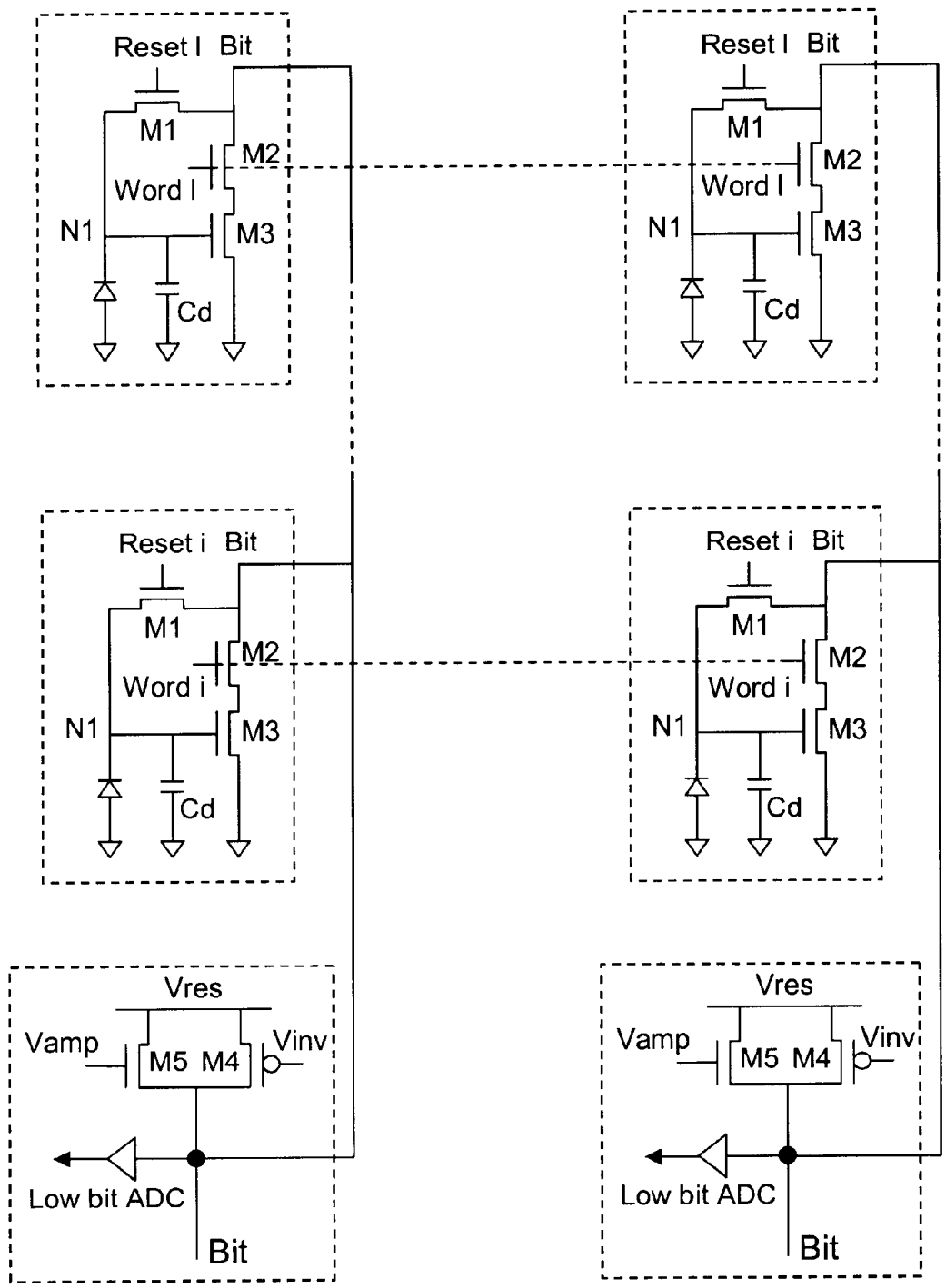
FIG. 5 shows the circuit schematic diagram of portion of the CMOS image sensor of FIG. 4.

In another preferred embodiment of the present invention, as illustrated in FIG. 4, a low-bit resolution and high spatial resolution CMOS area image sensor 200 is provided for operation of more than 1-bit but less than 6-bits. A more detailed illustration of the connection between the pixels and the column processors is illustrated in FIG. 5. This embodiment differs from the embodiment illustrated in FIG. 1 in that the sense amplifier connected to the bitline in FIG. 1 is now replaced with a low-bit (i.e., less than 6 bits) ADC, which converts analog image signal into digital image signal. Preferably, analog dithering is performed by changing a reset value of the pixel as described previously in this specification and by modifying the ADC quantization levels of the low-bit ADC. For example, for a low bit single slope ADC, analog dithering with the ADC may also be performed by introducing an offset in the starting voltage of the RAMP voltage or the start time of the counter. Analog dithering can also be performed with other low bit ADC architectures such as flash ADC, successive comparison ADC, successive approximation ADC, and algorithmic ADC.

Figure 6:
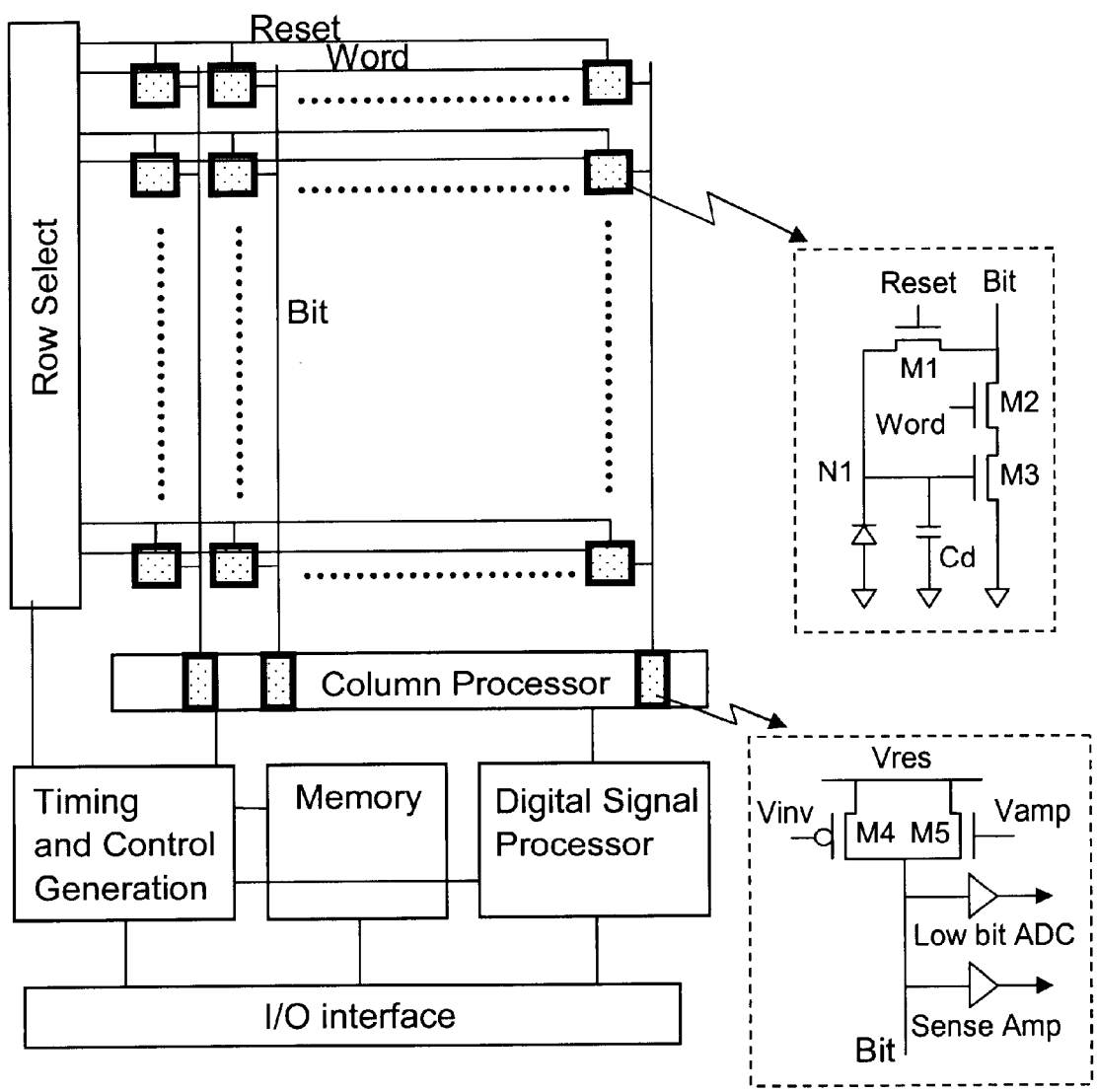
FIG. 6 illustrates another low bit resolution but high spatial resolution CMOS area image sensor of the present invention.

Referring to FIG. 6, in accordance with another preferred embodiment of the present invention, a low-bit resolution and high spatial resolution CMOS area image sensor is provided. This image sensor is adapted to include a sense amplifier in its column processor for 1-bit operation, as well as a low-bit ADC, also in the column processor, for more than 1-bit but less than 6-bit operation. For 1-bit operation, the ADC is not used and the operation of this CMOS image sensor is the same as that of FIG. 1. For more than 1-bit but less than 6-bits operation, the low-bit ADC is used but not the sense amplifier, and the CMOS image sensor operates in the same manner as that of FIG. 4. Preferably, analog dithering is also obtained in this CMOS image sensor by changing the reset value of the pixels.

The inverting amplifier (transistors M3, M4 and M5) is of common source configuration. It can be seen as consisting of two amplifiers sharing the same transconductance transistor M3 in the pixel. More particularly, transistor M3 and load transistor M4 form a digital inverter, whereas transistor M3 and load transistor M5 forms an analog inverting amplifier.

For black and white (1-bit) applications, such as facsimile imaging, the digital inverter (including transistors M3 and M4) is used, whereas the analog inverting amplifier (including transistors M3 and M5) is not utilized. The image signal, after going through the digital inverter, is sent to the sense amplifier, which converts it into a binary value and provides it to digital signal processor.

Conversely, for operation of more than 1-bit resolution, the analog inverting amplifier (including transistors M3 and M5) is used, whereas the digital inverting amplifier (including transistors M3 and M4) is not used. The image signal, after going through the analog inverting amplifier, is sent to the low bit ADC, which converts it into a binary value and provides it to digital signal processor.

Figure 7:
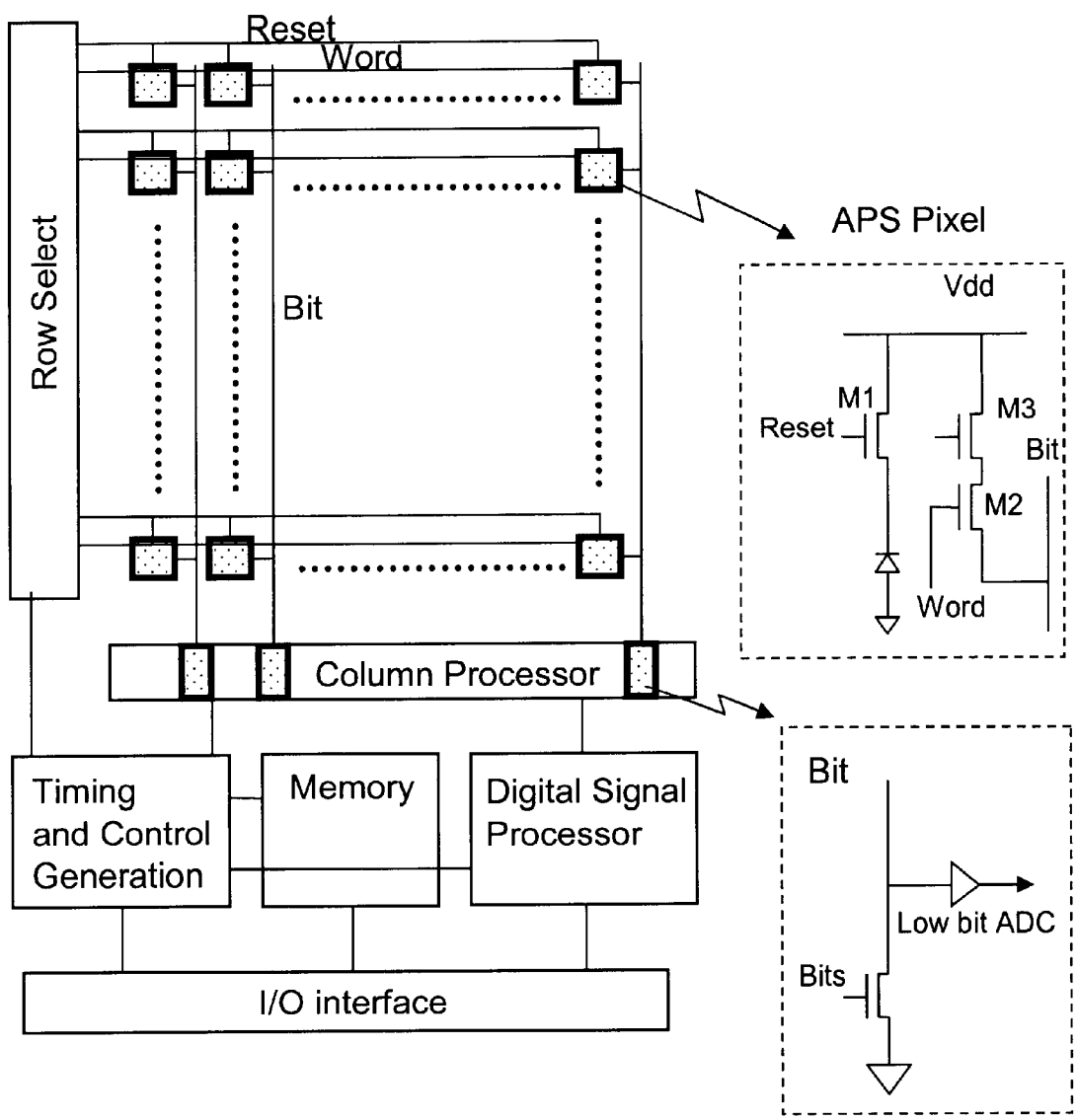
FIGS. 7–8(B) illustrate respectively other embodiments of low bit resolution but high spatial resolution CMOS area image sensor of the present invention.

In the preferred embodiments described above, each of the pixel sensor includes a photodetector and an inverting voltage amplifier. The photodetector may be a photodiode, a photogate-type detector, or a photo-transistor. It should be apparent, however, that the low-bit resolution and high spatial resolution CMOS area image sensor of the present invention is not limited to the specific pixel structure described in the preferred embodiment. Other known pixel structures may also be used in place of the preferred pixel structure described herein. For example, FIG. 7 illustrates a low-bit resolution and high spatial resolution CMOS area image sensor having a pixel structure of a conventionally known APS structure; a low-bit ADC is used to covert analog image signal into digital image signal. Preferably, this CMOS image sensor also performs analog dithering as described before.

Figure 8A:
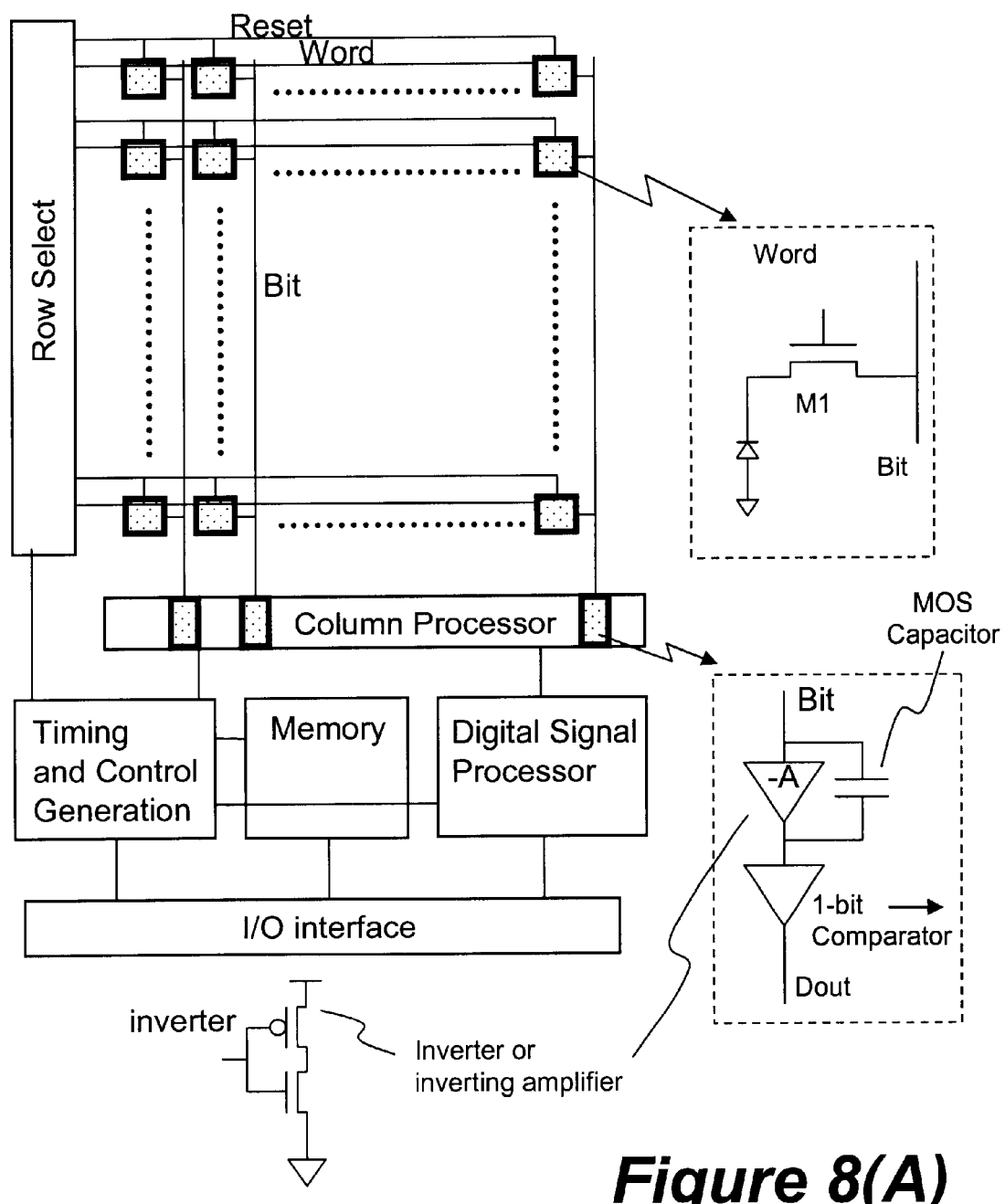
Figure 8B:
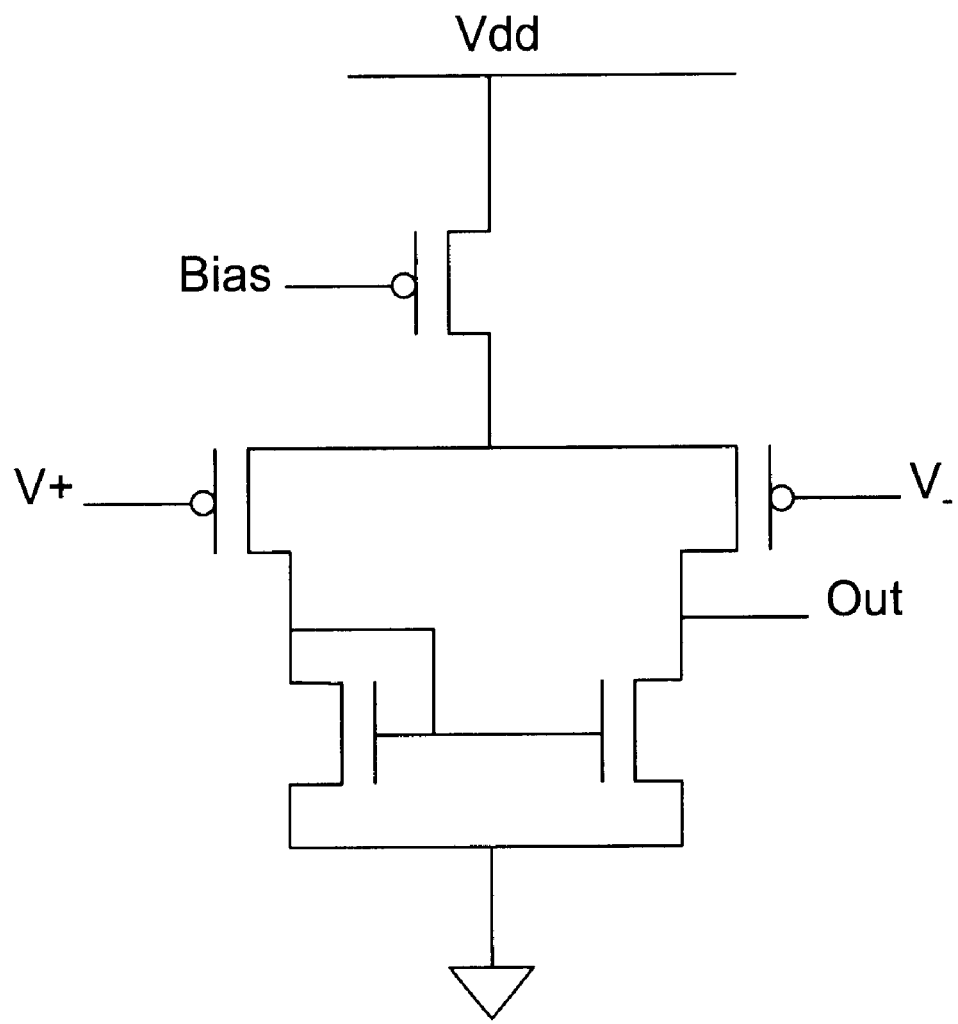

FIGS. 8(A) and 8(B) illustrates a 1-bit resolution and high spatial resolution CMOS area image sensor having a pixel structure of a conventionally known PPS structure. An inverter (in FIG. 8(A)) or an inverting amplifier (FIG. 8(B)) is used together with a 1-bit comparator in the column processor for converting analog image signal into digital image signal. Advantageously, no ADC is used in this sensor. If desired, electronic shuttling can also be provided in APS and pixel level ADC sensor amps.

In accordance with another aspect of the present invention, a variable spatial and bit resolution CMOS area image sensor is provided. This CMOS image sensor has programmable spatial resolution and bit resolution. The high bit resolution is obtained at the expense of spatial resolution by using spatial oversampling.

In accordance with the present invention, analog dithering and digital processing is used to obtain spatial oversampling to achieve bit resolution more flexibly and efficiently. In a preferred embodiment, a variable spatial and bit resolution CMOS image sensor having the same structure as the high spatial resolution and low bit resolution CMOS area image sensor as described earlier. In addition, the CMOS sensor include means to perform spatial oversampling in accordance with the following algorithm of the present invention.

In the pixel array, an N×M pixel block is grouped together to form a super pixel. Assuming that maximum voltage swing is normalized to 1 and each pixel has been quantized to a bit m without analog dithering (e.g., m=1 for the black and white). Those pixel values are denoted by $x_{(1,1)}$, $x_{(1,2)}$, ... $x_{(N,M)}$. It is also assumed that the general noise level (i.e., thermal noise, substrate noise, ground bounce, feed through noise) is less than but approximately equal to $2^{-n}$ (the value of n can be determined by testing). We divide them into two cases according to the relative values of n and m.

If n<=m, this means that the general noise level exceeds the quantization noise. In this case, although a single pixel is quantized to m-bit, the effective bit resolution is only n-bit. In this case, the super pixel value is obtained by computing the mean of $x_{(1,1)}$, $x_{(1,2)}$, ... , $x_{(N,M)}=(x_{(1,1)}+x_{(1,2)}+x_{(1,3)} \cdots +x_{(N,M)})/(N\times M)$. It is reasonable to assume that the system noise at each pixel is independent of each other, so the total noise of $x_{(1,1)}+x_{(1,2)}+ \cdots +x_{(N,M)}$ is about $(N\times M)^{0.5}$ times whereas the signal grows about N×M times. This causes signal to noise ratio to increase by $(N\times M)^{0.5}$ times or increasing the effective bit-resolution by $0.5 \log_2(N\times M)$ bits. In general, this method increases 1-bit of resolution for 4 times of spatial oversampling. For example, 1-bit resolution is gained by pooling 4 pixels together, two bits by pooling 16 pixels together and 3 bits by pooling 64 pixels together.

When n>m, the digital summation method as described above does not work. Instead, analog dithering is first applied to m-bit quantization. Here if $2^{n-m+1}-1>=N\times M$, then set L=N×M, otherwise, set $L=2^{n-m+1}-1$. In this case, L pixels are first pooled together to form n-bit super-pixels. But if L<N×M, we use the technique discussed in the previous paragraph to form a super-super pixel to achieve even higher bit resolution. If, for ease of description, relabeling $x_{(1,1)}$ as $X_1$, $x_{(1,2)}$ as $x_2$, ..., and $x_{(n,m)}$ as $x_L$, the dithering values added to $x_1$, $x_2$, ... $x_L$ are respectively $i/(2^{m-1}(L+1))$ for $i=-(L-1)/2,-(L-1)/2+1, \ldots, (L-1)/2$.

To obtain the super pixel value, either one of the following two methods.

Method 1 involves the following procedures:
1) If L is an odd number, set $s=x_{(L+1)/2}$; If L is an even number, set $s=x_{L/2}$
2) set s_v=max(0, s−1);
3) set $dx=(L+1)*s\_v/2+(x0>s\_v)+ \ldots (xL>s\_v)$ where (x>y) is defined as 1 if true, or 0 otherwise; and
4) The final super pixel value is $dx/(2^{(m-1)}*(L+1))$.

Method 2 involves the following procedure:
1) Set two variables upper bound UB=1 and lower bound LB=0;
2) For each i=1, 2, ... L, NLB=floor($x_i*2^m$); NUB=floor ($x_i-i*2/(L-1)*2^m$) if NLB>LB, then LB=NLB; if NUB<UB, then UB=NUB;

After looping through $x_1, \ldots x_L$, the final pixel value is between LB and UB (e.g., (LB+UB)/2);

Preferably, either one or both methods are implemented in the column processor block of the CMOS image sensor, which may be used for video imaging as well as photography. Thus, a variable spatial and bit resolution CMOS area image sensor is provided, which may be used for video imaging or photography which requires a high bit resolution but low spatial resolution, as well as document imaging, such as photocopying and facsimile, which requires a high spatial resolution but low bit resolution. It should be apparent that present invention is not limited to the specific spatial oversampling techniques or algorithms described herein; any other spatial oversampling techniques or algorithms may also be used.

In accordance with the present invention, the high spatial resolution and low bit resolution CMOS area sensor of the present invention is used to provide various device imaging capabilities, such as an integrated cellular telephone with facsimile capabilities, a barcode reader, a photocopier, or a machine vision imaging system.

Figure 9:
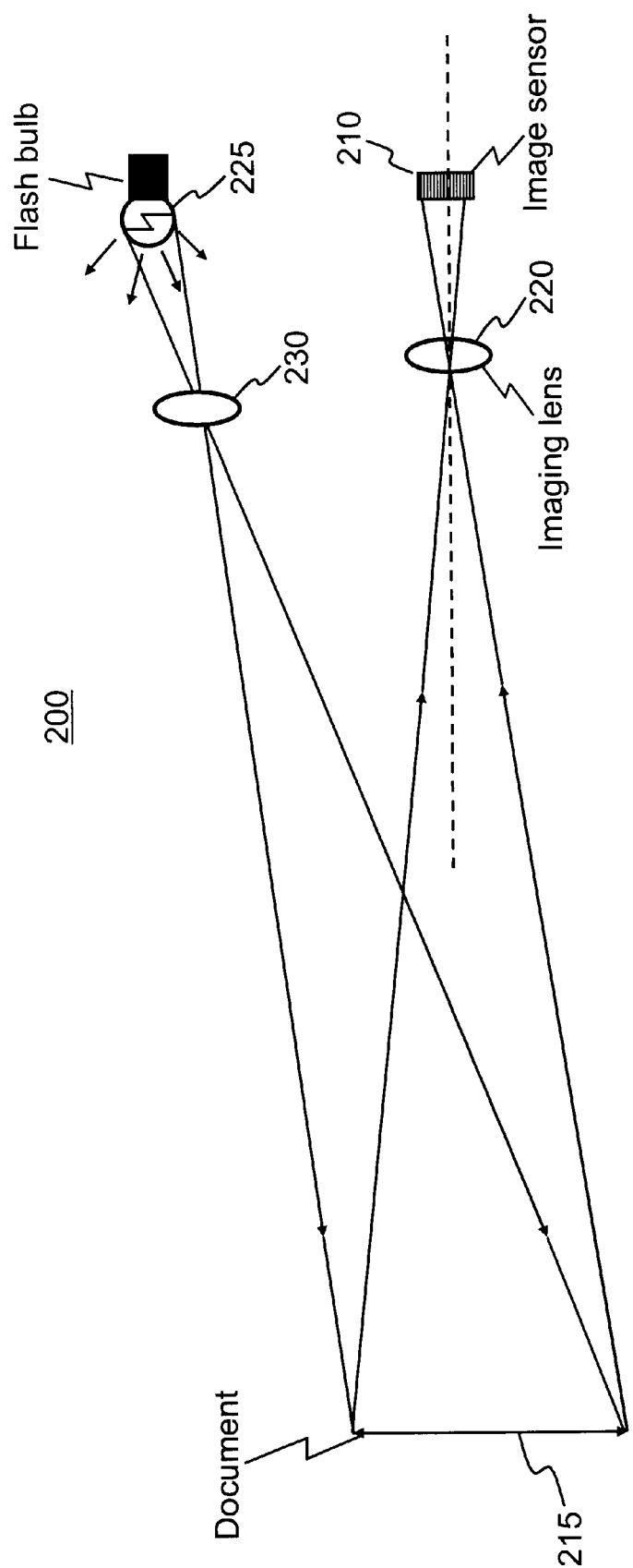
FIG. 9 illustrates an imaging apparatus of the present invention.

Referring to FIG. 9, in accordance with the another embodiment of the present invention, an imaging system 200, in a preferred embodiment, includes a low bit resolution and high spatial resolution CMOS area image sensor 210 of the present invention for sensing an image of a document 215, and an optical system including a flash bulb 225 for illuminating document 215 through a lens 230, and a lens 220 for projecting an image of the document onto the CMOS area image sensor. CMOS area image sensor 210 of the present invention has a bit resolution of less than 6 bits and a high spatial resolution and fabricated in accordance with a CMOS process characterized by having a minimum gate length of 0.35 micron or less. The CMOS image sensor includes a pixel sensor array having at least 1000×900 pixels, a timing and control generation circuit for generating timing and control signals for said image sensor, a row selecting circuit for selecting one or more rows of pixels for readout, a column processor for selecting one of more column of pixels for readout, and an input/output circuit for providing a data interface. Preferably, the CMOS sensor further includes a digital signal processor for performing digital signal processing and a on-chip memory device. More preferably, the CMOS image sensor includes an electronic shutter.

In addition, imaging system 200 may include a memory device external to the CMOS sensor for storing the image captured by the CMOS sensor. Preferably, imaging system 200 further includes electrical and/or mechanical switching means for turning the flash bulb on and at the same time, opening the electronic shutter in the CMOS sensor.

In a preferred embodiment, the imaging system is a copier for reproducing a printed image onto a tangible media, such as a sheet of paper. The system further comprises means for using data representing such printed image provided by the CMOS sensor to reproduce such image on the tangible media.

In another preferred embodiment, the imaging system is a barcode reading device. The system further comprises decoding means for receiving image data corresponding to such barcode image sensed by the CMOS area image sensor of the present invention and decoding such barcode image to generate a corresponding code.

Figure 10:
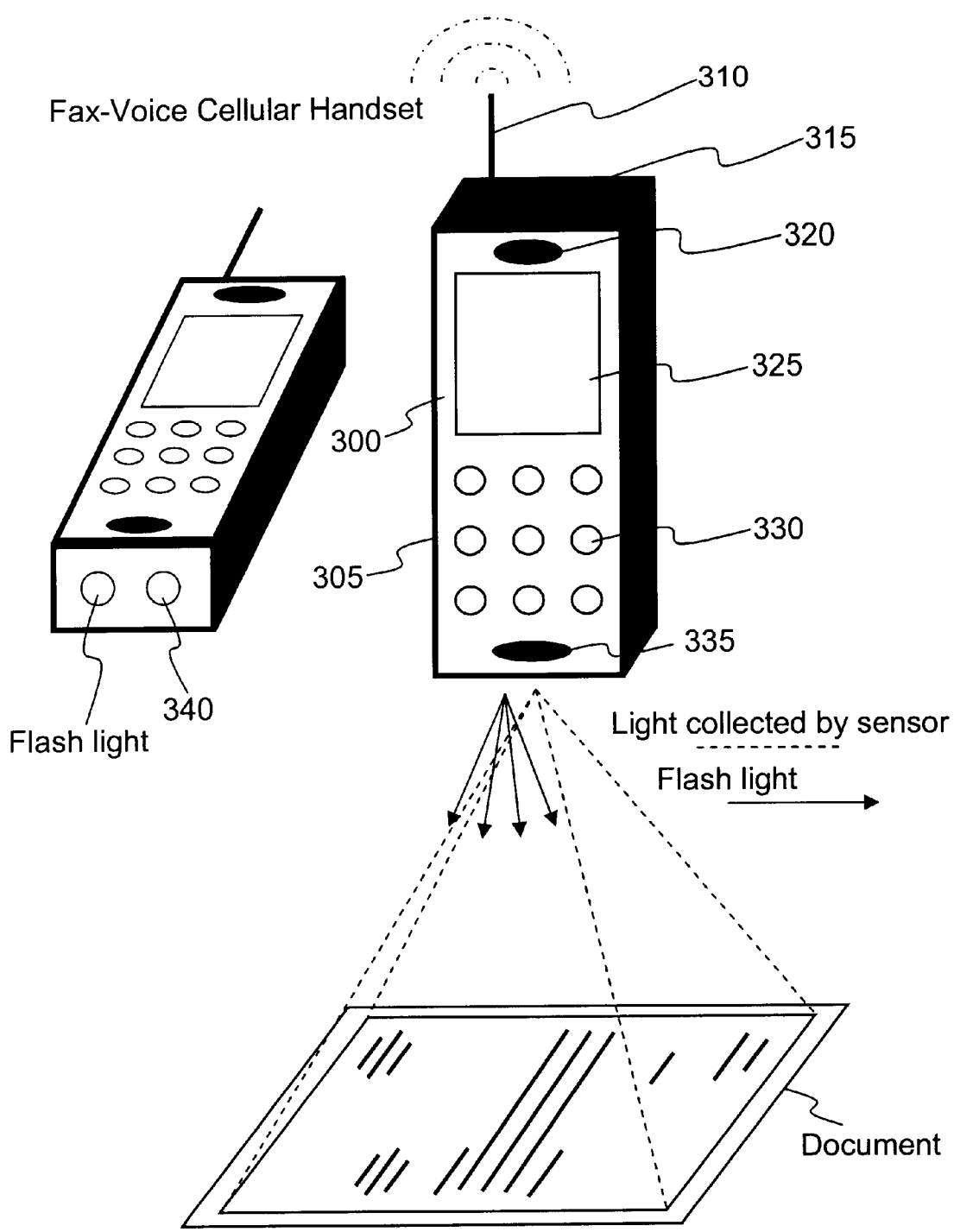
FIGS. 10–14 refer respectively to a communications device of the present invention.
Figure 11:
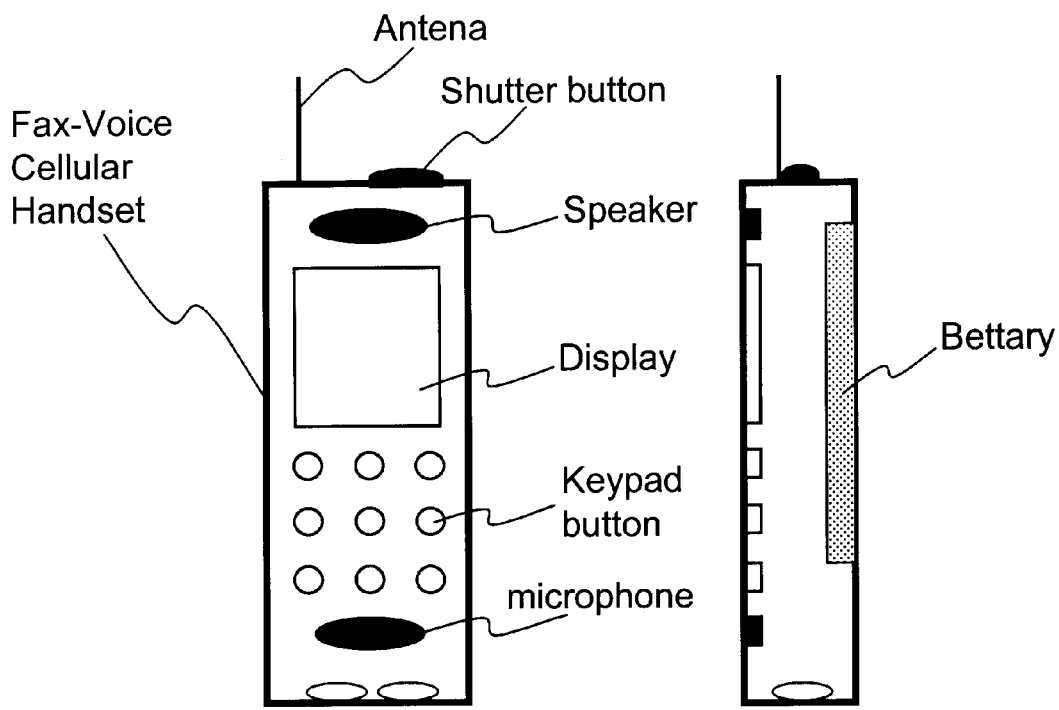
Figure 11:
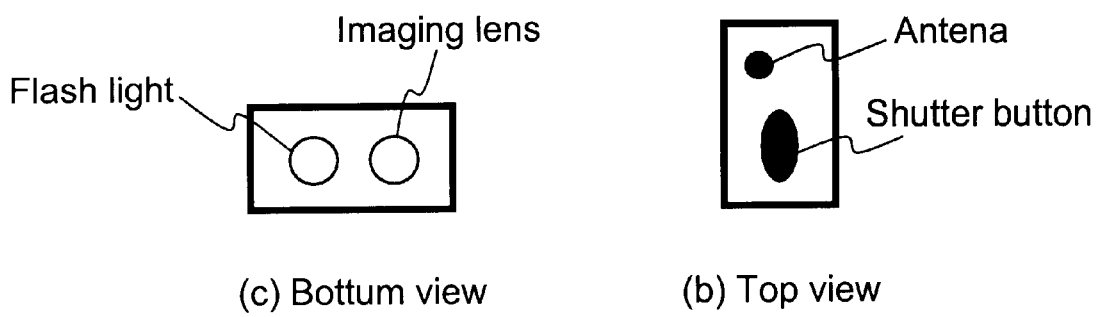

In accordance with another embodiment of the present invention, a communication device is provided which is capable of transmission of both voice signal as well as image signal provided by a high spatial resolution and a low bit resolution area image sensor is provided. Referring to FIG. 10, in a preferred embodiment, the communication device is a cellular handset 300 which includes a housing 305, an antenna 310, a shutter button 315, a speaker 320, a display 325, keypad buttons 330, and a microphone 335. Inside the a handset (not shown) is a low bit resolution and high spatial resolution CMOS area image sensor of the present invention. The bottom of the handset exposes a imaging lens 340 for projecting an image to be transmitted or stored onto the CMOS area image sensor. A flash light 345 is provided at the bottom of the handset for providing illumination for imaging. The front, side, top and bottom views of the handset are illustrated in FIG. 11.

Figure 12:
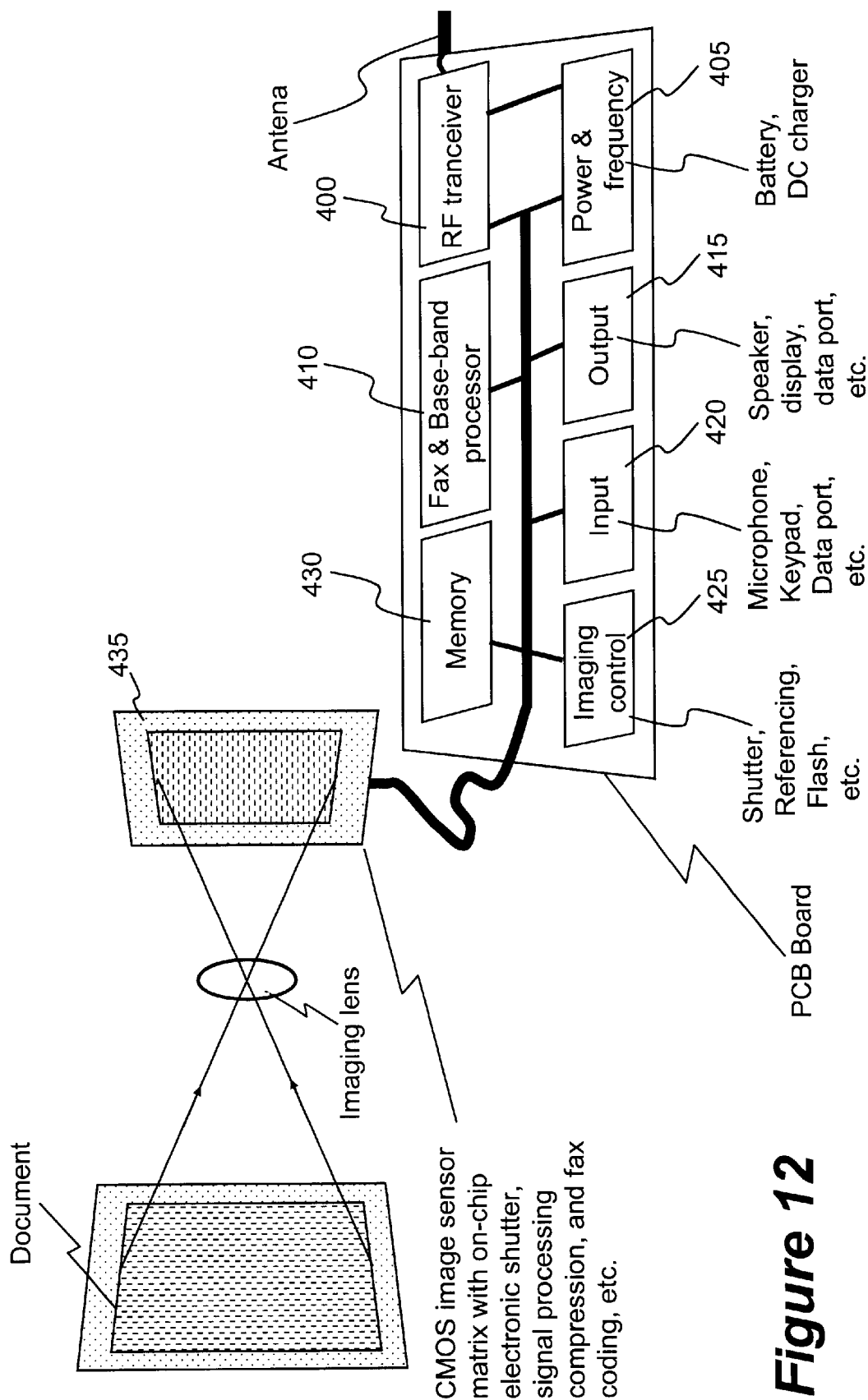

Referring to FIG. 12, which illustrates the handset in function blocks, the handset includes a RF receiver and transmitter module 400 for receiving and transmitting signals via the antenna. A power and frequency module 405 is provided for providing power and frequency control to the handset. The hand set further includes a facsimile and base-band processor 410, an output module 415 for output to the speaker, display and/or data port, an input module 420 connected to the microphone, keypad and/or data port, an imaging control module 425 for controlling the electronic shutter (on the CMOS area image sensor), and a memory module 430 for storing image data or other types of data. A CMOS area image sensor is provided for sensing an image, such as a document, via the image lens. Preferably, the CMOS image sensor includes on-chip electronic shutter, digital signal processor for performing signal compression and facsimile coding.

Figure 13:
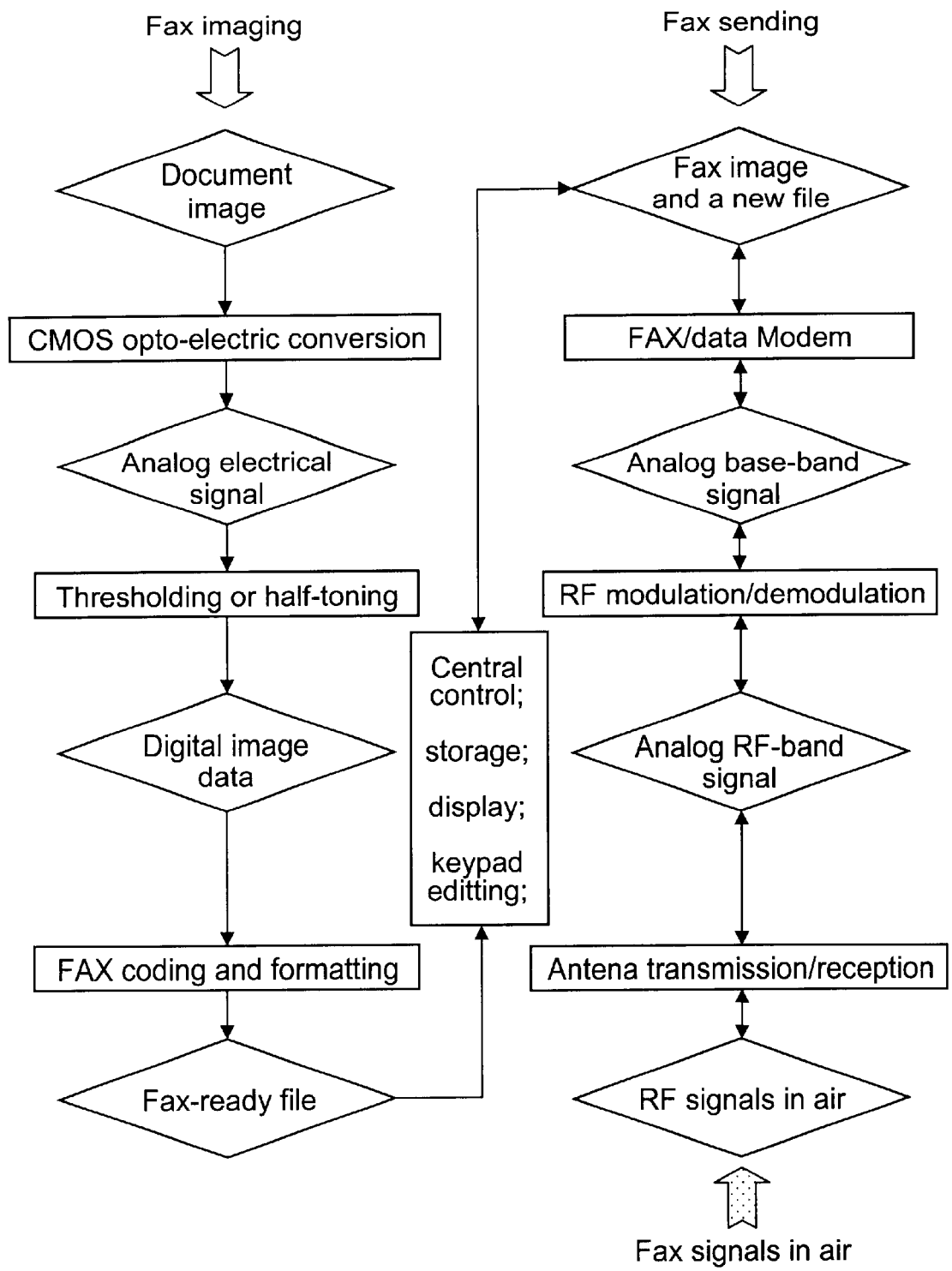
Figure 14:
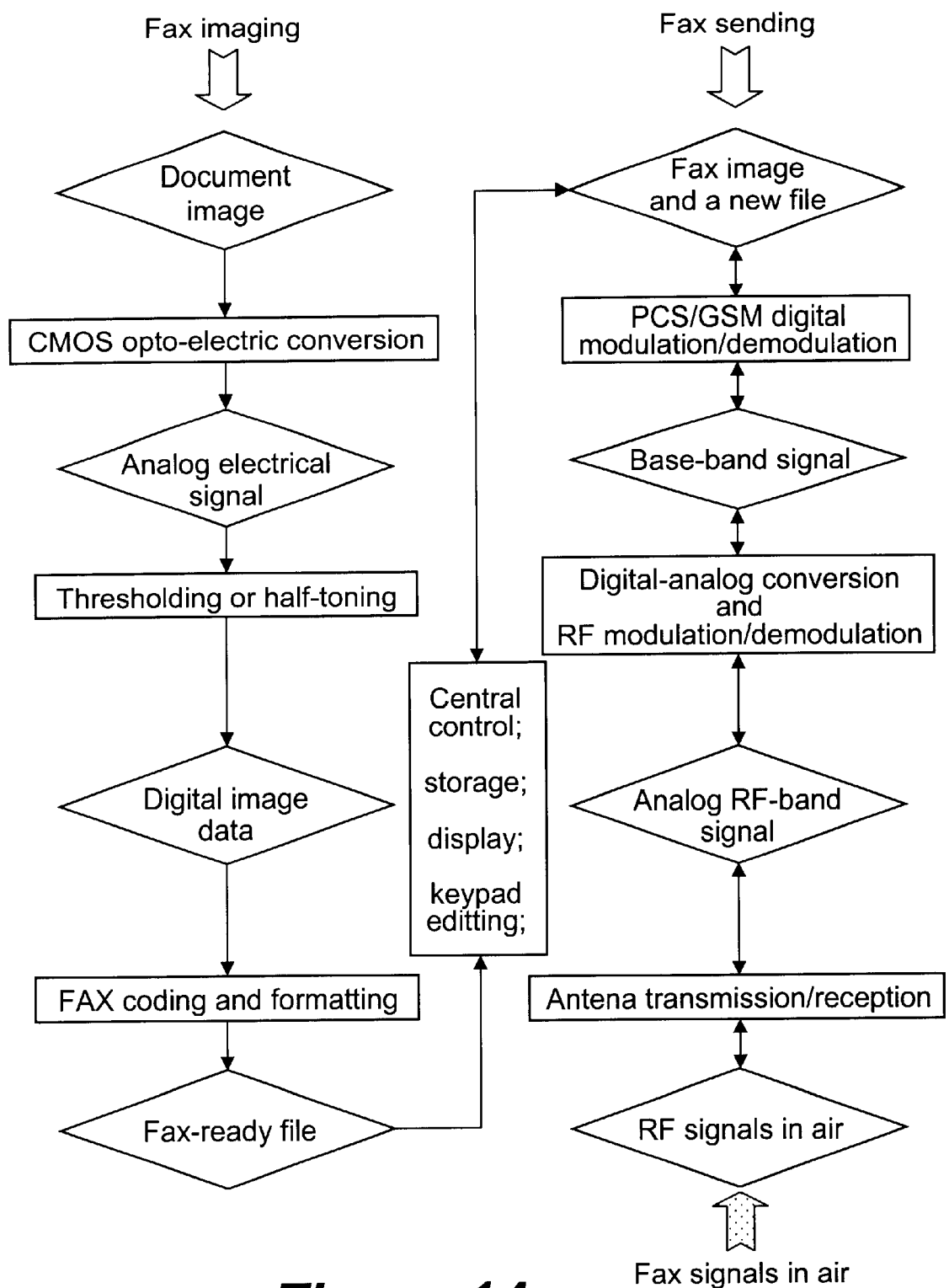

In the preferred embodiment, the handset is specifically adapted for facsimile operation in additional to cellular voice communications. FIG. 13 shows, in a preferred embodiment, a program flow chart for an analog cellular handset. FIG. 13 illustrates, in a preferred embodiment, a program flow chart for a digital cellular handset.

In the preferred embodiment, the CMOS image sensor has a bit resolution of less than 6 bits and a high spatial resolution and fabricated in accordance with a CMOS process characterized by having a minimum gate length of 0.35 micron or less. The CMOS image sensor includes a pixel sensor array having at least 1000×900 pixels, a timing and control generation circuit for generating timing and control signals for said image sensor, a row selecting circuit for selecting one or more rows of pixels for readout, a column processor for selecting one of more column of pixels for readout, a digital signal processor for performing digital signal processing, and an input/output circuit for providing a data interface. Preferably, the digital signal processor performs coding and/or compressing image data for facsimile transmission.

In accordance with another embodiment of the present invention, a cellular phone with both video and facsimile capabilities is provided. The cellular phone includes a variable spatial and bit resolution CMOS area image sensor of the present invention as described earlier in the specification for both document imaging and video imaging.

In accordance with another embodiment of the present invention, a programmable video/photo/document imaging input device for computer and internet communications is provided. The input device includes a variable spatial and bit resolution CMOS area image sensor of the present invention as described earlier in the specification for video, photography, and document imaging.

In accordance with another embodiment of the present invention, a programmable video/photo/document imaging input device for video phone and telephone video conferencing is provided. The input device includes a variable spatial and bit resolution CMOS area image sensor of the present invention as described earlier in the specification. This device can communicate via various media, such as the internet, ADSL channel, cable connections, satellite, fiber optical network, and wideband network such as ATM.

In accordance with another embodiment of the present invention, a programmable imaging input device for TV set-top box or web TV is provided. The input device includes a variable spatial and bit resolution CMOS area image sensor of the present invention as described earlier in the specification.

It will be apparent to those skilled in the art that numerous modifications may be made within the scope of the invention, which is defined in accordance with the following claims.

What is claimed is:

1. An apparatus producing image signals adaptive to a predefined application, said apparatus comprising:
    an image sensor configurable to produce said image signals having a spatial resolution and an N-bit resolution in accordance with said predefined application, said image sensor having a sensor spatial resolution, said spatial resolution being upper limited by said sensor spatial resolution and N being equal to or greater than 1, wherein said image sensor includes a plurality of sensor circuits configured in a two-dimensional array, each of said sensor circuits including:
        a sensor pixel producing one of said sensor signals when being exposed to said incident light; and
        a first circuit causing said one of said sensor signals adjusted in accordance with one or more of parameters arranged in a two-dimensional array, wherein the size of said two-dimensional array for said parameters is substantially smaller than the size of said image sensor and each of said parameters is selectively configurable to be different from each other in accordance with said predefined application;
    an optical system, in front of said image sensor, collecting and focusing incident light reflected from an object onto said image sensor; and
    an output circuit, coupled to said image sensor, receiving said image signals and outputting said image signals thereof after said image signals are processed therein with respect to said predefined application.

2. The apparatus as recited in claim 1, wherein said image sensor is a Complementary Metal-Oxide Semiconductor (CMOS) sensor.

3. The apparatus as recited in claim 2, wherein said image sensor further comprises a second circuit converting said adjusted sensor signals respectively to said image signals.

4. The apparatus as recited in claim 3, wherein said second circuit comprises a plurality of comparing circuits, each of said comparing circuits comparing one of said adjusted sensor signals with a predefined threshold and outputting one of said image signals in said spatial resolution being said sensor spatial resolution and said N-bit resolution with N=1.

5. The apparatus as recited in claim 4, wherein said predefined application is for a facsimile application and said image signals is compressed according to a facsimile standard and coupled to said output circuit.

6. The apparatus as recited in claim 5, wherein said image sensor still further comprises a third circuit causing, respectively, a number of said digital signals to be combined to one of said image signals, said image signals thus being in said spatial resolution being less than said sensor spatial resolution and said N-bit resolution, wherein N>1.

7. The apparatus as recited in claim 3, wherein said second circuit comprises a plurality of analog-to-digital converters (ADCs) producing digital signals by digitizing said adjusted sensor signals.

8. The apparatus as recited in claim 7, wherein said image sensor still further comprises a third circuit causing, respectively, a number of said digital signals to be combined to one of said image signals, said image signals thus being in said spatial resolution being less than said sensor spatial resolution and said N-bit resolution wherein N>1.

9. The apparatus as recited in claim 1, wherein the apparatus is one of a communication device capable of voice communications and image transmission, a portable imaging device, and a document imaging device.

10. The apparatus as recited in claim 9, wherein said parameters are configured to cause a spatial resolution of the image signals from the image sensor to be less than the sensor spatial resolution such that the image signals can be efficiently transmitted.

11. The apparatus as recited in claim 10, wherein said parameters are so configured such that the image signals are generated with an M-bit resolution, and M<N.

12. A method for producing image signals adaptive to a predefined application, the method comprising:
    producing the image signals, from an image sensor, having a spatial resolution and an N-bit resolution in accordance with a predefined application, the image sensor having a sensor spatial resolution, the spatial resolution being upper limited by the sensor spatial resolution and N being equal to or greater than 1, wherein the image sensor includes a plurality of sensor circuits configured in a two-dimensional array, each of the sensor circuits including:
        a sensor pixel producing one of the sensor signals when being exposed to the incident light; and a first circuit causing the one of the sensor signals adjusted in accordance with one or more of parameters arranged in a two-dimensional array, wherein the size of the two-dimensional array for the parameters is substantially smaller than the size of the image sensor and each of the parameters is selectively configurable to be different from each other in accordance with the predefined application;

receiving the image signals in an output circuit coupled to the image sensor, and outputting the image signals after the image signals are processed in the output circuit with respect to the predefined application.

13. The method as recited in claim 12, wherein the image sensor is a Complementary Metal-Oxide Semiconductor (CMOS) sensor.

14. The method as recited in claim 13, wherein the image sensor further comprises a second circuit converting the adjusted sensor signals respectively to the image signals.

15. The method as recited in claim 14, wherein the second circuit includes a plurality of comparing circuits, each of the comparing circuits comparing one of the adjusted sensor signals with a predefined threshold and outputting one of the image signals in the spatial resolution being the sensor spatial resolution and the N-bit resolution with N=1.

16. The method as recited in claim 15, wherein the predefined application is for a facsimile application and the image signals is compressed according to a facsimile standard and coupled to the output circuit.

17. The apparatus as recited in claim 12, wherein the image sensor still further comprises a third circuit causing, respectively, a number of the digital signals to be combined to one of the image signals, the image signals thus being in the spatial resolution being less than the sensor spatial resolution and the N-bit resolution, wherein N>1.

18. The apparatus as recited in claim 17, wherein the second circuit comprises a plurality of analog-to-digital converters (ADCs) producing digital signals by digitizing the adjusted sensor signals.

19. The apparatus as recited in claim 18, wherein the image sensor still further comprises a third circuit causing, respectively, a number of the digital signals to be combined to one of the image signals, the image signals thus being in the spatial resolution being less than the sensor spatial resolution and the N-bit resolution wherein N>1.

* * * * *